United States Patent [19]

Dudden

[11] Patent Number: 4,850,753

[45] Date of Patent: Jul. 25, 1989

[54] POSITIVE FEED DEVICE

[75] Inventor: Christopher J. Dudden, Boscombe, Great Britain

[73] Assignee: Desoutter Limited, London, England

[21] Appl. No.: 152,827

[22] Filed: Feb. 5, 1988

[51] Int. Cl.$^4$ .............................................. B23B 45/00
[52] U.S. Cl. ....................................... 408/14; 74/417; 173/19; 408/137; 408/138
[58] Field of Search .................... 408/8, 10, 13, 14, 15, 408/20, 137, 138, 139, 141; 173/19, 29, 32, 154; 74/417

[56] References Cited

U.S. PATENT DOCUMENTS

| | | | |
|---|---|---|---|
| 2,462,647 | 2/1949 | Koza | 74/417 |
| 2,604,795 | 7/1952 | Ristow | 74/417 |
| 3,487,729 | 1/1970 | Juhasz et al. | 408/14 |
| 3,574,290 | 4/1971 | Eckman | 408/132 |
| 3,583,822 | 6/1971 | Alexander et al. | 408/11 |
| 3,901,098 | 8/1975 | Jinkins | 74/417 |
| 4,592,681 | 6/1986 | Pennison et al. | |
| 4,681,490 | 7/1987 | Pennison etal. | |

Primary Examiner—Joseph H. McGlynn
Assistant Examiner—Daniel W. Howell
Attorney, Agent, or Firm—Fleit, Jacobson, Cohn, Price, Holman & Stern

[57] ABSTRACT

A gear train between an input shaft and an output shaft includes an output gear, through which the output shaft moves axially, and an intermediate gear coaxial with a control shaft carrying an idler gear meshing with a nut threaded on the output shaft. The idler gear is axially movable between a first position in which a first dog clutch connects the idler gear to the intermediate gear so that the nut rotates relative to the output shaft, thereby causing the shaft to be fed to the right, and a second position in which the first dog clutch is disengaged and a second dog clutch connects the idler gear to a fixed member, thereby causing the rotating shaft to be fed to the left. A collar on the shaft acts on a lever which moves the control shaft together with the idler gear from the first position to an intermediate position. In the intermediate position, balls are urged radially inwards by a bevel on a piston to enter a recess in the control shaft, thereby urging the shaft together with the idler gear to the second position, in which the second clutch is engaged.

14 Claims, 3 Drawing Sheets

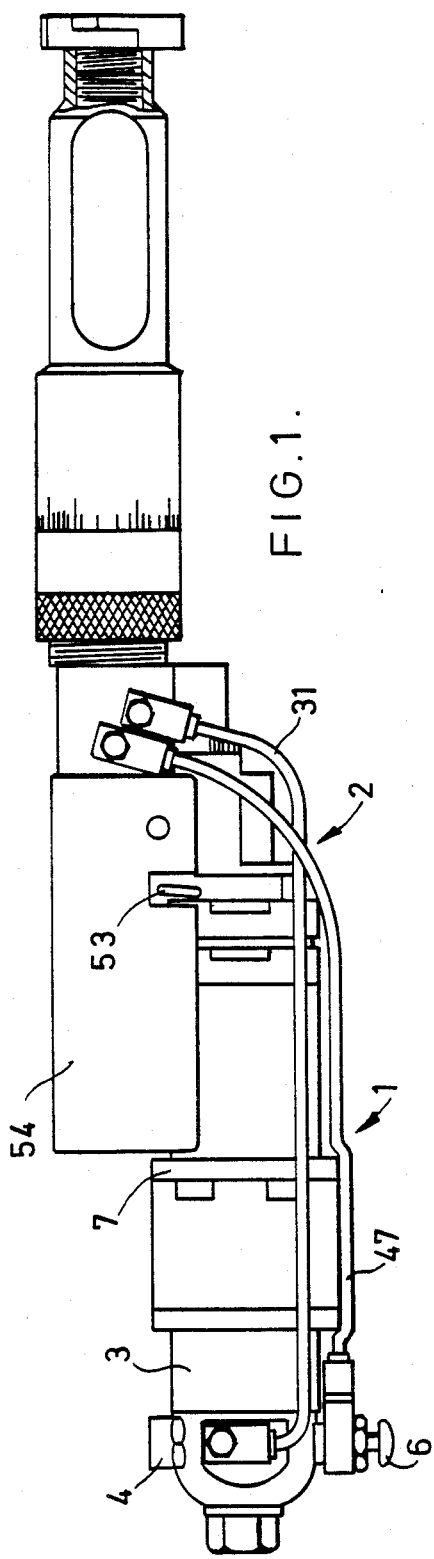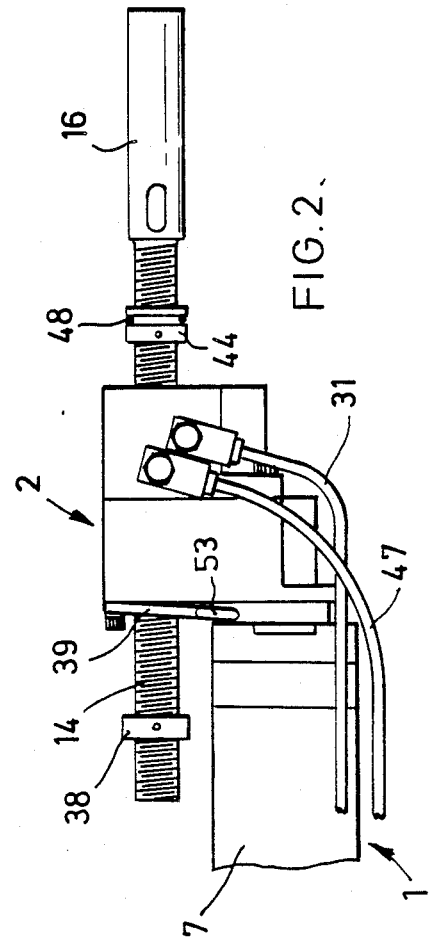

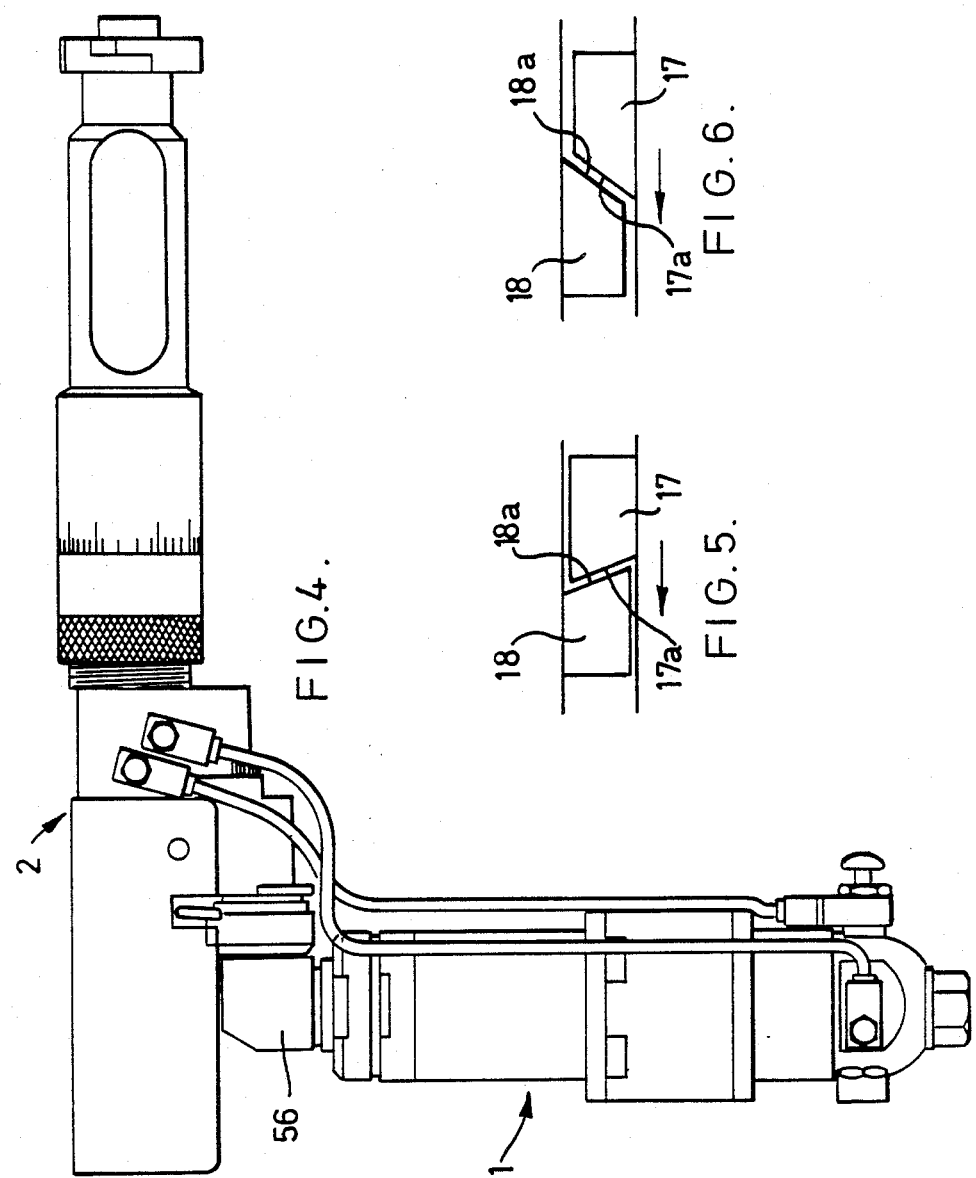

POSITIVE FEED DEVICE

BACKGROUND OF THE INVENTION

Field of Invention

This invention relates to a positive feed device, in particular for a power tool such as a drill driven by a pneumatic motor.

SUMMARY OF THE INVENTION

The invention provides a positive feed device comprising: an input shaft: an output shaft; a gear train between the said shaft, including an intermediate gear and an output gear which is arranged to rotate with the output shaft but through which the output shaft is freely movable axially; an idler gear on a control shaft coaxial with the intermediate gear; a nut threaded on the output shaft and kinematically connected to the idler gear; first clutch means between the idler gear and the intermediate gear and second clutch means between the idler gear and a fixed member, the control shaft and the idler gear being axially movable between a first position, in which only the first clutch means is engaged, and a second position, in which only the second clutch means is engaged; the gearing ratios between the intermediate gear and the output gear and between the idler gear and the nut being such that, when the idler gear is in the first position, the nut rotates relative to the output shaft, thereby causing the output shaft to be fed in a first direction; the output shaft being fed in the opposite, second direction when the idler gear is in the second position; desengagement means for moving the idler gear and the control shaft to an intermediate position part-way towards the second position; and engagement means for acting on the control shaft to move it together with the idler gear from the intermediate position to the second position, the engagement means being independent of the disengagement means.

The disengagement means may comprise an actuating element acting on the control shaft and/or may be constituted by the first clutch means in the form of a torque-sensitive clutch.

The invention also provides a power tool comprising a drive assembly having an output and a positive feed device having an input, the drive assembly and the positive feed device being selectively connectable together (a) directly, so that the output and the input are in line, and (b) via an angle transmission unit, so that the output and the input are at an angle (e.g. 90°0 ).

The invention will be described, by way of example only, with reference to the accompanying drawings.

BRIEF DESCRIPTION OF THE DRAWINGS

FIG. 1 is a side elevational view of a positive feed drill of the invention;

FIG. 2 is a side elevational view of part of the drill of the invention;

FIG. 4 is a side elevational view of an alternative embodiment of drill of the invention;

FIG. 5 is a schematic view which diagrammatically illustrates a detail of the positive feed device; and FIG. 6
is a view similar to FIG. 5 which diagrammatically illustrates a detail of another embodiment of positive feed device.

DESCRIPTION OF PREFERRED EMBODIMENTS

Figure 3:
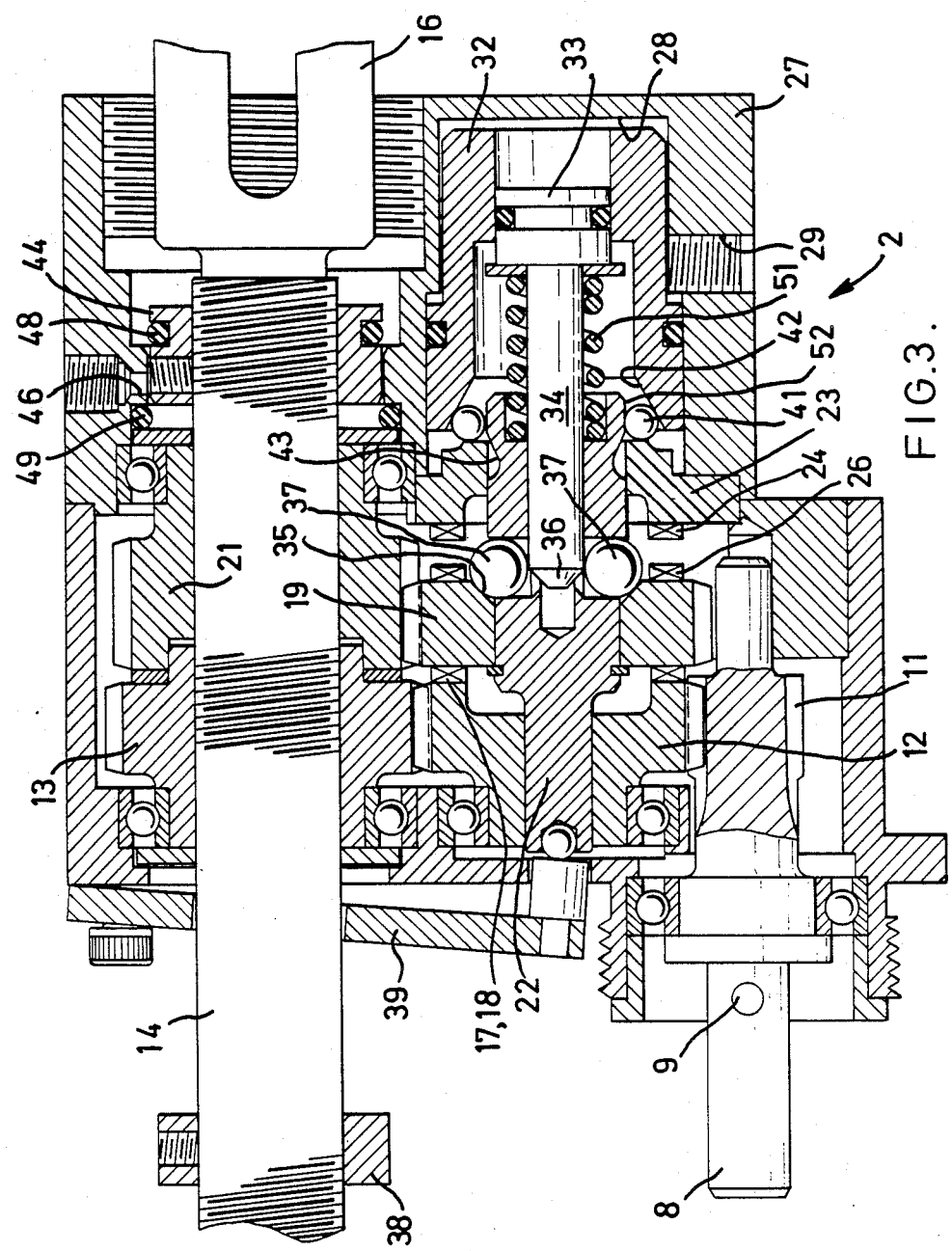
FIG. 3 is an enlarged axial cross-sectional view through the positive feed device of the drill of the invention.

The positive feed drill illustrated in FIGS. 1 to 3 comprises a drive assembly 1 connected to a positive feed device 2. The drive assembly 1 is a known unit comprising a pneumatic motor 3 with a start button 4 and a stop button 6, and a gearbox 7. The output of the drive assembly 1 is connected to an input shaft 8 of the positive feed device 2 by means of a shear pin 9.

The input shaft 8 carries an input gear 11 which drives an intermediate gear 12 which, in turn, drives an output gear 13 splined on an output shaft 14 having an attachment 16 for a drill chuck. The intermediate gear 12 has dogs 17 which engage with dogs 18 on an idler gear 19 which, in turn, engages a gear in the form of a nut 21 threaded on a left-handed screwthread formed on the output shaft 14. The gearing ratios between the intermediate gear 12 and the output gear 13 and between the idler gear 19 and the nut 21 are such that the nut 21 turns faster than the output shaft 14 and therefore causes it to move to the right at a given feed rate.

The idler gear 19 is mounted on a control shaft 22 spigotted in the intermediate gear 12 and supported at its other end by a fixed member 23 having dogs 24 which are to engage with corresponding dogs 26 on the idler gear 19. The dogs 24,26 may be square or, preferably, angled to facilitate engagement and disengagement. When the dogs 24,26 are engaged, the idler gear 19 and, therefore, the nut 21 cease rotation, with the result that the rotating output shaft 14 moves to the left.

The casing 27 of the positive feed device defines a chamber 28 which is connected to the air supply of the motor 3 via an inlet 29 and a pipe 31. The chamber 28 contains a main piston 32 which, in turn, contains an auxiliary piston 33 having a piston rod 34 which extends into the shaft 22 and which has a tapered end portion 36.

In the position shown in FIG. 3, the rod 34 causes a set of balls 37 (held in apertures in the shaft 22) to act on a bevelled surface 35 of the idler gear 19 so as to keep its dogs 18 in engagement with the dogs 17 of the intermediate gear 12.

When an adjustable collar 38 on the output shaft 14 bears upon a lever 39, the shaft 22 is pushed gradually to the right, carrying with it the idler gear 19. Just before the dogs 17,18 disengage , a set of balls 41 (located by the shaft 22, the member 23, and a bevelled surface 42 of the main piston 32) begin to enter an annular recess 43 in the shaft 22. Since the main piston 32 is urged to the left by the air pressure in the chamber 28, the balls 41 are forced into the recess 43, thereby drawing the shaft 22 and with it the idler gear 19 to the right, so that the dogs 26 on the idler gear 19 are brought into engagement with the dogs 24 of the fixed member 23. Subsequently, motion of the output shaft 14 continues until a collar 44 adjustably mounted on the shaft 14 arrives opposite an air outlet port 46 connected to the drive assembly 1 by a pipe 47. Closure of the port 46 by two O-ring seals 48,49 causes a pressure signal to be communicated to the drive assembly 1, which thereupon switches off automatically. Consequently, supply of air under pressure to the chamber 28 ceases and the auxiliary piston 33 moves to the right under the action of a spring 51, allowing the balls 37 to move radially inwards in the apertures in the shaft 22, while the shaft is pushed to the left by the spring. At the same time the balls 41 are forced out of the recess 43 and onto a cylindrical surface 52 of the shaft 22, the main piston 32 being free to move to the right.

When the drill is to be re-started, the start button 4 is pressed and air pressure is communicated to the chamber 28, thereby urging the pistons 32,33 to the left. The tapered end portion 36 of the piston rod 34 acts on the balls 37 which, in turn, act on the bevelled surface 35 of the idler gear 19, urging it to the left until its dogs 18 intercalate with the dogs 17 of the intermediate gear 12. Thereafter, the balls 37 rest on the cylindrical surface of the piston rod 34 and cannot be pushed inwards by the idler gear 19. The operating cycle then continues as described above. Since reversal and stopping of the drill are automatic, an operator can control a number of drills at the same time. He can at any time stop the drill by pressing the stop button 6 or reverse the feed direction by pressing an extension 53 of the lever 39. The rear end of the shaft 14 is covered by a guard 54.

FIG. 4 shows the drive assembly 1 connected to the positive feed device 2 via an angle head 56. This option is particularly useful when operating in restricted spaces.

In order to prevent the dogs 17,18 from disengaging accidentally, their abutting surfaces 17a, 18a are preferably arranged at a negative angle, i.e. the dogs are undercut, as shown in FIG. 5.

However, when the drilling load is light, it may be advantageous to arrange the abutting surfaces 17a, 17b with a positive angle, i.e. to bevel the dogs, as shown in FIG. 6, so that the dogs then function as a torque sensitive clutch, pushing the idler gear 19 to the right if the torque exceeds a given value, thereby protecting the bit from damage. Such an arrangement can, of course, replace the lever 39, since the torque will rise rapidly as the collar 38 comes up against the housing of the positive feed device 2.

I claim:

1. A positive feed device comprising: an input shaft; an output shaft; a gear train between said shafts, including an intermediate gear and an output gear which is arranged to rotate with the output shaft but through which the output shaft is freely movable axially; a control shaft coaxial with the intermediate gear; an idler gear mounted on the control shaft; a nut threaded on the output shaft and kinematically connected to the idler gear; first clutch means between the idler gear and the intermediate gear and second clutch means between the idler gear and a fixed member, the control shaft and the idler gear being axially movable between a first position, in which only the first clutch means is engaged, and a second position, in which only the second clutch means is engaged; the gearing ratios between the intermediate gear and the output gear and between the idler gear and the nut being such that, when the idler gear is in the first position, the nut rotates relative to the output shaft, thereby causing the output shaft to be fed in a first direction; the output shaft being fed in the opposite, second direction when the idler gear is in the second position; disengagement means for
moving the idler gear and the control shaft to an intermediate position part-way towards the second position; and engagement means for acting on the control shaft to move it together with the idler gear from the intermediate position to the second position, the engagement means being independent of the disengagement means.

2. A device as claimed in claim 1, wherein said disengagement means and the engagement means are at opposite sides of the idler gear.

3. A device as claimed in claim 1,
wherein the engagement means comprises an annular control surface coaxial with said control shaft, radially movable elements arranged around the axis of said control shaft, and means for urging said elements radially towards
said control surface, said elements engaging with said fixed member said control surface being on said control shaft and having a cylindrical section and a recessed section, said elements being opposite said cylindrical section when said control shaft is in said first position and being opposite said recessed section when said control shaft is in said intermediate position.

4. A device as claimed in claim 3,
wherein said urging means comprises an axially movable member with a bevelled surface coaxial with said control shaft.

5. A device as claimed in claim 4,
wherein said axially movable member comprises a piston running in a chamber having an air inlet.

6. A device as claimed in claim 1,
wherein said disengagement means comprises an actuating element arranged to act on one end of said control shaft in order to push it from the first position towards the second position.

7. A device as claimed in claim 6,
wherein said actuating element comprises a lever cooperating with an abutment element on the output shaft.

8. A device as claimed in claim 1,
wherein said disengagement means comprises a torque sensitive clutch which constitutes the first clutch means and which urges the idler gear from the first position to the intermediate position when the torque to be transmitted by the first clutch exceeds a given value.

9. A device as claimed in claim 1,
wherein said idler gear is axially movable relative to the control shaft.

10. A device as claimed in claim 9,
and further comprising idler gear control means for keeping the idler gear in a given axial position on the control shaft while in the first position and while moving from the first position to the second position, for allowing axial movement of the idler gear relative to the control shaft while moving from the second position towards the first position, and for urging the idler gear towards said given axial position.

11. A device as claimed in claim 10, wherein said idler gear control means comprise balls mounted for radial movement in the control shaft, a bevelled surface on the idler gear adjacent the balls, and an axially movable cylindrical rod mounted in an axial bore in the control shaft and having a tapered end portion adjacent the balls.

12. A power tool comprising a device as claimed in claim 1 and a drive assembly having an output connectable to the input shaft of the device.

13. A power tool as claimed in claim 12, and further comprising an angle transmission unit removably attachable between said drive assembly and said positive feed device, said drive assembly and said positive feed device being selectively connectable together directly to orient the output of said drive assembly in line with said input shaft , or connectable together by attachment of said angle transmission unit to said drive assembly and said feed device to orient the output of said drive assembly at an angle with respect to said input shaft 14. A power tool comprising a drive assembly having an output, a positive feed device having an input, and an angle transmission unit having an input directly connectable to said drive assembly output and an output directly connectable to said positive feed device input so that said drive assembly output and said positive feed device input are oriented at an angle with respect to each other, said angle transmission unit being removable and said drive assembly output being directly connectable to said positive feed device input to orient said drive assembly output in line with said positive feed device input.

* * * * *